March 28, 1939.　　　L. E. WHITTAKER　　　2,152,369
FILM MAGAZINE
Filed Aug. 10, 1937　　　3 Sheets-Sheet 1
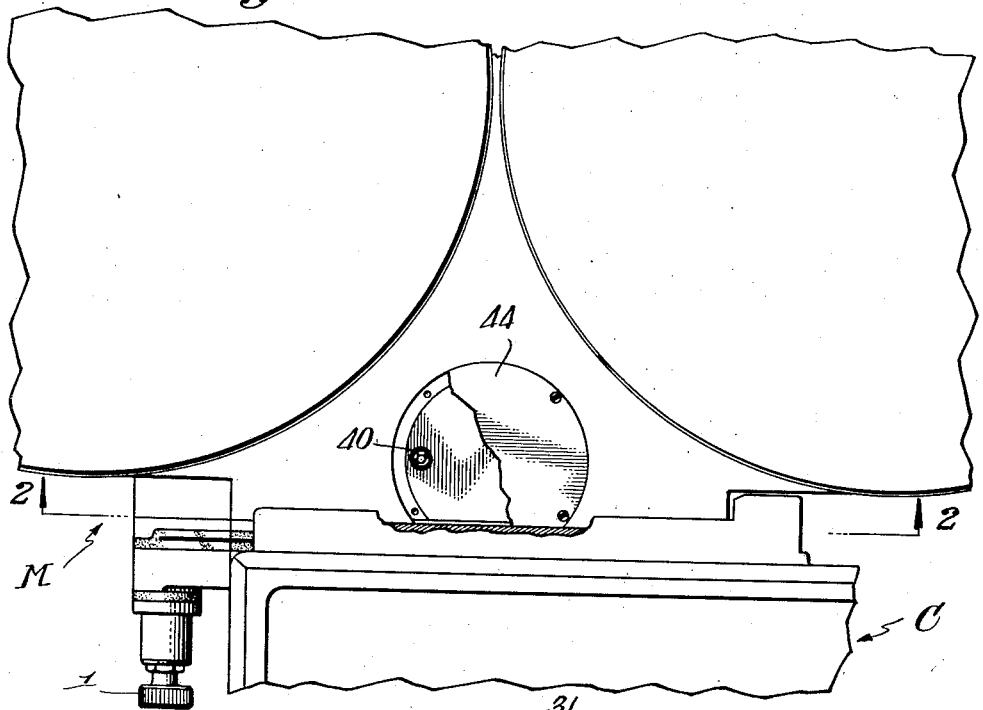
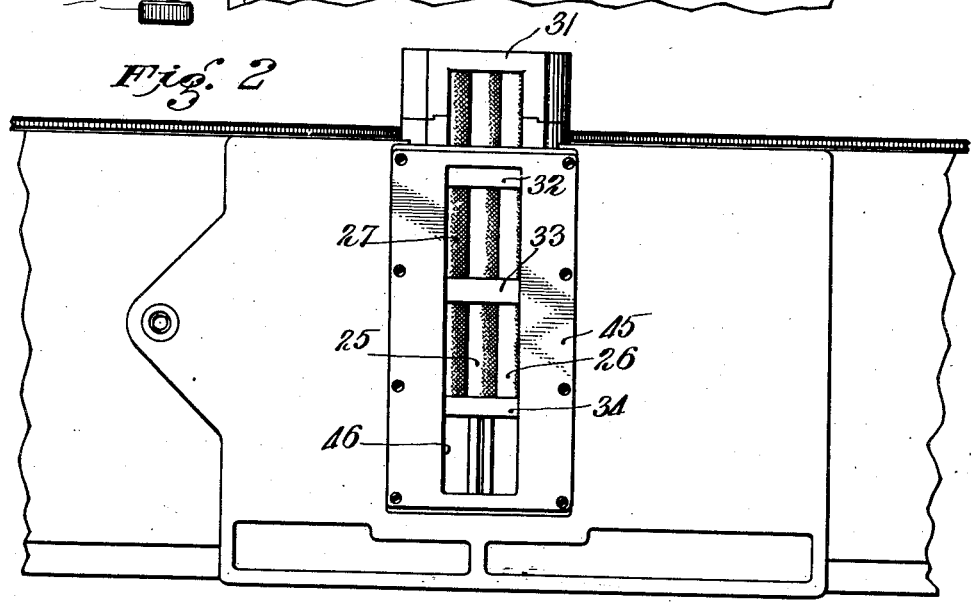
INVENTOR
Lloyed E. Whittaker
BY Roberts, Cushman & Woodbury
ATTORNEY March 28, 1939.   L. E. WHITTAKER   2,152,369
FILM MAGAZINE
Filed Aug. 10, 1937   3 Sheets-Sheet 2
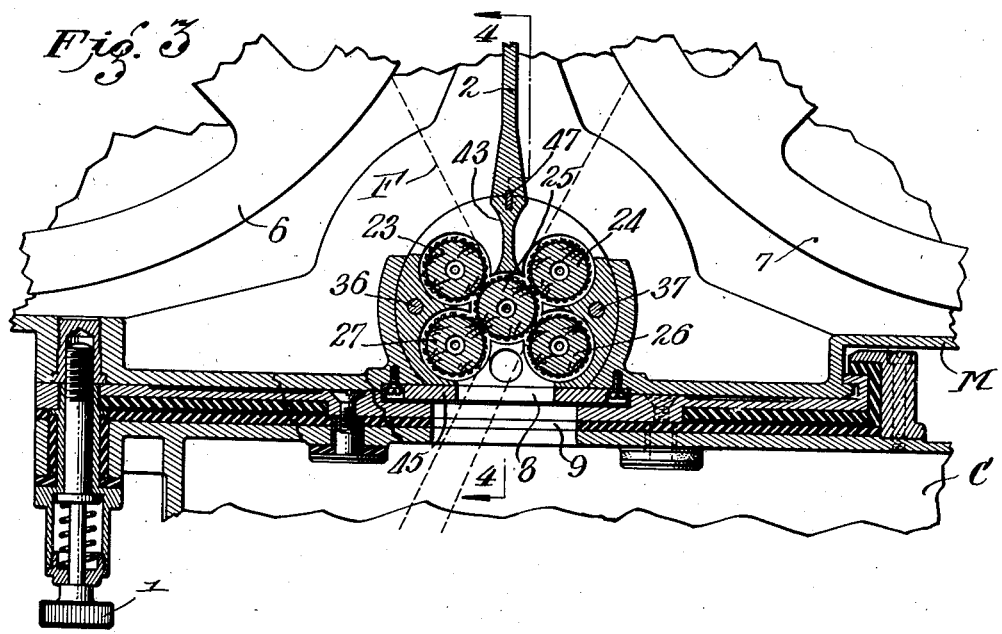
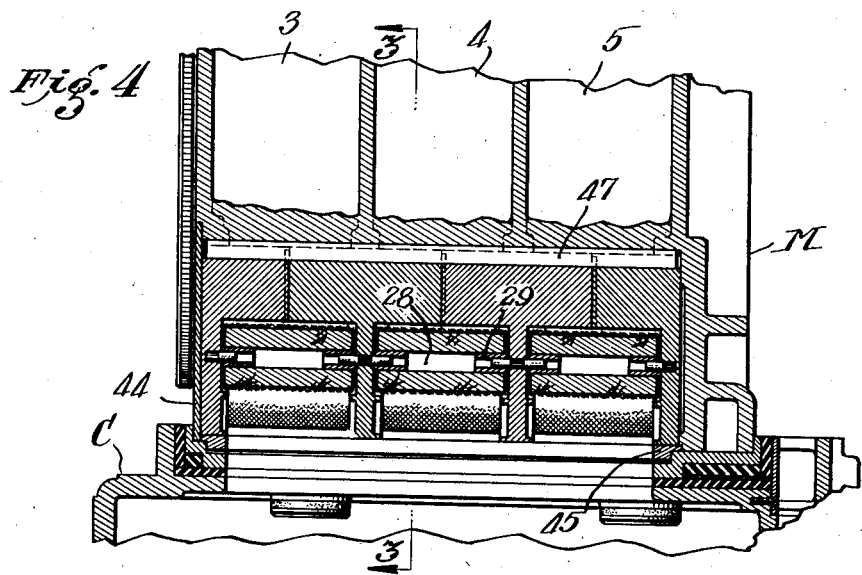
INVENTOR
Lloyed E. Whittaker
BY Roberts, Cushman & Woodberg
ATTORNEY March 28, 1939.　　L. E. WHITTAKER　　2,152,369
FILM MAGAZINE
Filed Aug. 10, 1937　　3 Sheets-Sheet 3
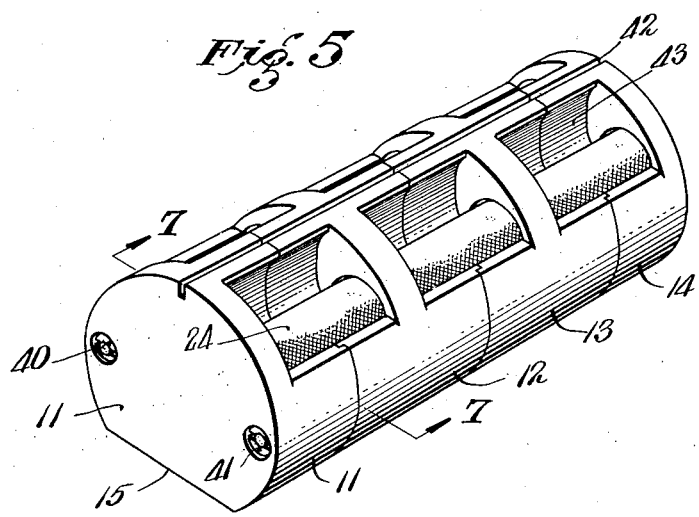
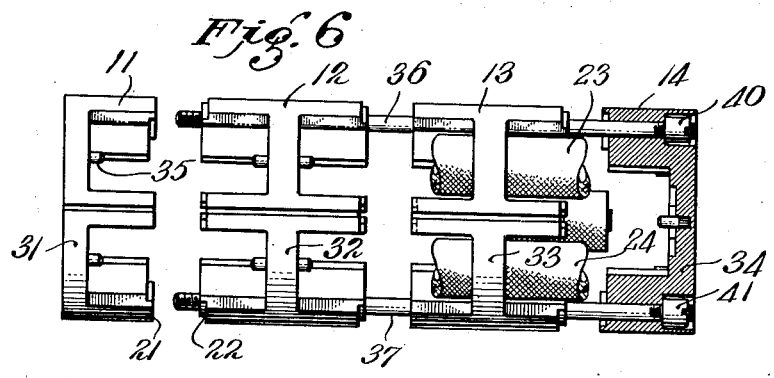
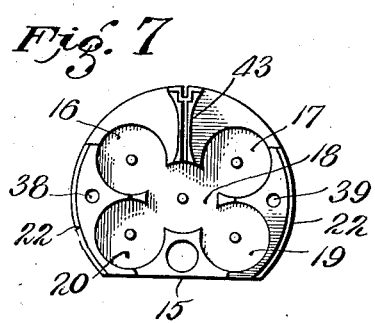
INVENTOR
Lloyed E. Whittaker
BY Roberts, Cushman & Woodberry
ATTORNEY Patented Mar. 28, 1939

2,152,369

UNITED STATES PATENT OFFICE 2,152,369

FILM MAGAZINE

Lloyed E. Whittaker, Hollywood, Calif., assignor to Technicolor Motion Picture Corporation, Hollywood, Calif., a corporation of Maine Application August 10, 1937, Serial No. 158,311

8 Claims. (Cl. 88—17)

This invention relates to magazines for motion picture film and more particularly to magazines for cameras of the type which concomitantly expose a plurality of color-separation negatives for use in producing pictures in natural colors.

Objects of the invention are to provide means for feeding film to and/or from a magazine which effectively excludes light from the magazine when it is removed from the camera, which reduces friction and static to a minimum, which is simple and compact in construction, which is convenient and durable in use, which can be assembled as a unitary device before application to the magazine, which can be applied to the magazine from the side of the magazine, and which is generally superior to prior-art devices for the same general purpose.

For the purpose of illustration a typical embodiment of the invention is shown in the accompanying drawings in which, Fig. 1 is a side elevation of associated parts of a camera and magazine;

Fig. 2 is a bottom plan of the magazine, viewed from the plane of line 2—2 of Fig. 1;

Fig. 3 is a vertical section of the associated parts of the camera and magazine on the line 3—3 of Fig. 4;

Fig. 4 is a section on the line 4—4 of Fig. 3;

Fig. 5 is a perspective view of the light-excluding unit of the magazine;

Fig. 6 is a top view of the unit with the sections slightly separated from one another; and Fig. 7 is an end elevation of one of the two central sections of the unit, viewed from line 7—7 of Fig. 5.

The particular embodiment of the invention chosen for the purpose of illustration comprises a camera C and a magazine M, the top of the camera being provided with a guideway slidably to receive the magazine from the side, and a screw 1 to retain the magazine in position on the camera. The magazine has a central partition 2 on each side of which are three compartments 3, 4 and 5, each compartment being adapted to accommodate one reel, two of which are shown at 6 and 7 in Fig. 3. The three reels on one side of the partition 2 are in alignment with the three reels respectively on the other side of the partition whereby films F (Fig. 3) may be fed from one reel downwardly through registering openings 8 and 9 in the bottom of the magazine and the top of the camera respectively, thence through the camera mechanism and thence upwardly through the openings to the corresponding reel on the other side of the partition 2.

To exclude light from entering the magazine through the opening 8 when the magazine is removed from the camera, light-excluding means are mounted over the opening 8. In the illustration this means comprises four sections 11, 12, 13 and 14, 11 and 14 comprising end sections and 12 and 13 comprising intermediate sections. Each of these sections has a cross-sectional contour which is cylindrical throughout more than half the periphery thereof, the remaining portion 15 of the periphery being flat. As shown in Fig. 7 each section has five recesses 16, 17, 18, 19 and 20, the end sections 11 and 14 having these recesses only on their inner ends and the intermediate sections 12 and 13 having these five recesses on each end. Juxtaposed ends of the sections have telescoping portions 21 and 22 which overlap when the sections are fitted together end to end, and when the sections are thus fitted together the opposed recesses in juxtaposed sections form compartments to receive the five rollers 23, 24, 25, 26 and 27. As shown in Fig. 4 the rollers have axial openings 28 and a bearing sleeve 29 is fast in each end of each opening. Fast on each of the transverse walls 31, 32, 33 and 34 of the sections 11, 12, 13 and 14 are bearing pins 35 coaxial with the recesses 16, 17, 18, 19 and 20 for rotatably supporting the rollers in the compartments. The sections 11, 12, 13 and 14 are preferably formed of Bakelite in which case the pins 35 are preferably molded in the Bakelite. For the purpose of holding the sections 11, 12, 13 and 14 in telescoped relationship as a unitary device two bolts 36 and 37 extend through openings 38 and 39 in the sections with nuts 40 and 41 threaded on the ends of the bolts in recesses in the outer ends of the end sections 11 and 14. Extending along the top of the aforesaid sections is a keyway 42 and on opposite sides of the keyway openings are provided for the ingress and egress of the three films. Extending from the recesses for the central rollers 18 to the tops of the sections are partitions 43.

To receive the aforesaid light-excluding unit the magazine is provided with a socket having substantially the same shape and dimensions as the unit. This socket has an opening in the side of the magazine through which the light-excluding unit is inserted, with a cover 44 for this opening (Figs. 1 and 4). The socket also has a rectangular opening through the bottom of the magazine, the dimensions of this opening corresponding to the dimensions of the flat side 15 of the unit, this opening being partially covered by a plate 45 (Figs. 2 and 3), the plate having an opening 46 to permit the passage of the films. As shown in Figs. 3 and 4 a key 47 fits into the keyway 42 and a corresponding keyway in the partition 2 of the magazine.

As shown by the broken lines F in Fig. 3 the rollers cause the film to travel along a tortuous path in passing in and out of the magazine. By providing limited clearance between the respective rollers and between the rollers and the walls of the compartment in which the rollers rotate, and by covering the rollers with plush, light is effectively excluded from the magazine when the magazine is removed from the camera. As the film is fed through the device the rollers are caused to rotate by frictional engagement with the film. For example, if the film is being fed from reel 6 to reel 7 rollers 23, 24, 26 and 27 rotate in a clockwise direction and the central roller 25 rotates in a counterclockwise direction (Fig. 3).

It should be understood that the present disclosure is for the purpose of illustration only and that this invention includes all modifications and equivalents which fall within the scope of the appended claims.

I claim:

1. A magazine for motion picture film having in one side an opening through which film may be fed and in another side, adjacent said opening, a socket to receive a light-excluding unit from the latter side, said unit comprising a casing having inner and outer light-excluding ends and means in the casing for guiding the film, and means for securing said unit in the socket, said inner end being smaller than the socket so that the unit may be removed endwise through said latter side without disassembling the unit.

2. A magazine for motion picture film having in one side an opening through which film may be fed and in another side, adjacent said opening, a socket to receive a light-excluding unit from the latter side, said unit comprising a casing slidable into the socket and within the casing film-guiding rollers parallel with the axis of the socket, means for securing said unit in the socket, and an apertured plate secured over said opening, said casing being removable endwise from said socket without removing said plate.

3. A magazine for motion picture film having a cylindrical socket extending thereinto from one side along another adjacent side which intersects the periphery of the cylinder to form an opening through which film may be fed, light-excluding means slidable into the socket from said first side, said means comprising a cylindrical casing provided with inner and outer light-excluding ends, the diameter of said inner end being less than that of the socket.

4. A magazine for motion picture film comprising a tubular casing divided into sections along planes extending transversely of its axis and having openings in its periphery for the passage of film therethrough, rollers disposed in the casing parallel to said axis, means for rotatably supporting said rollers, said means comprising a bearing on each of two of said sections for each of said rollers and bearings on opposite sides of each of said sections except the end sections, and means extending through said casing from end to end for holding said sections together.

5. A magazine for motion picture film comprising a tubular casing divided transversely of its axis into a plurality of sections and having openings in its periphery for the passage of film therethrough, rollers disposed in the casing parallel to said axis, and means for rotatably supporting said rollers, said means comprising a bearing on each of two of said sections for each of said rollers and bearings on opposite sides of each of said sections except the end sections, and said sections having telescoping portions overlapping each other.

6. A magazine for motion picture film comprising a tubular casing divided into sections along a plurality of planes extending transversely of its axis, juxtaposed sections having opposed recesses together forming a compartment when the sections are assembled end to end, each of said sections except the end sections having recesses in its opposite ends, rollers disposed in said compartments parallel with the axis of the casing, bearings fast in the bottoms of said recesses rotatably to support said rollers, and means for securing the sections rigidly together to form a unitary device.

7. A magazine for motion picture film comprising a tubular casing divided into sections along a plurality of planes extending transversely of its axis, juxtaposed sections having opposed recesses together forming a compartment when the sections are assembled end to end, said sections having a cross-sectional contour which is cylindrical throughout more than half the periphery of the casing, rollers disposed in said compartments parallel with the axis of the casing, bearings fast in the bottoms of said recesses rotatably to support said rollers, and means for securing the sections rigidly together to form a unitary device.

8. A magazine for motion picture film having in one side an opening through which film may be fed and in another side, adjacent said opening, a socket to receive a removable light-excluding unit from the latter side, said removable unit comprising end portions and intermediate roller means for guiding the film, and means for securing said unit in the socket, said socket and unit being cylindrical throughout more than half their peripheries and the maximum diameter of the cylindrical unit being slightly less than the diameter of the socket so that the unit may be removed endwise without disassembling the unit.

LLOYED E. WHITTAKER.